Patented Jan. 15, 1935

1,987,669

UNITED STATES PATENT OFFICE 1,987,669

NAPHTHOIC ACID DERIVATIVE

Miles A. Dahlen, Wilmington, Del., assignor to E. I. du Pont de Nemours & Company, Wilmington, Del., a corporation of Delaware No Drawing. Application March 25, 1930, Serial No. 438,913

19 Claims. (Cl. 260—124)

This invention relates to organic compounds and more particularly to intermediates for the preparation of azo dyes. It specifically contemplates derivatives of 2-hydroxy-3-naphthoic acid.

It is an object of this invention to produce a series of new organic compounds. Another object is to produce new dyestuff intermediates. Other objects will appear hereinafter.

These objects are accomplished by the present invention whereby compounds are prepared having the probable formula

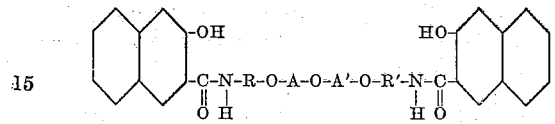

in which A and A' are alkylene radicals containing at least two carbon atoms and R and R' are benzene residues not containing a sulfonic acid or carboxylic acid group. In the formula A and A' may be alike or different. The same is true of R and R'. These compounds may be produced by condensing two mols of 2-hydroxy-3-naphthoic acid with the diamine corresponding to the aliphatic portion of the formula of the final product. Another method of carrying out this invention utilizes as a starting material 2-hydroxy-3-naphthoyl chloride. The process will be readily understood from a consideration of the following examples which disclose actual embodiments thereof.

Example I

One hundred forty-four (144) parts beta, beta'-di-(o-amino-phenoxy)-diethyl ether, 188 parts 2-hydroxy-3-naphthoic acid and 1880 parts of toluene are placed in a vessel equipped with a condenser and mechanical agitation. The charge is slowly heated to 60° C. and 50 parts of phosphorous trichloride are added. The material is heated to the boiling point and held at this temperature for 15 hours. 1000 parts of water and enough sodium carbonate to render the charge alkaline are added and the toluene is steam distilled off. The residue is cooled to room temperature and the solid product filtered off and dried. It is a nearly colorless compound, soluble in hot, dilute caustic soda solution, but is not readily soluble in organic solvents. It may be recrystallized from hot chlorobenzene.

This compound probably has the following formula:

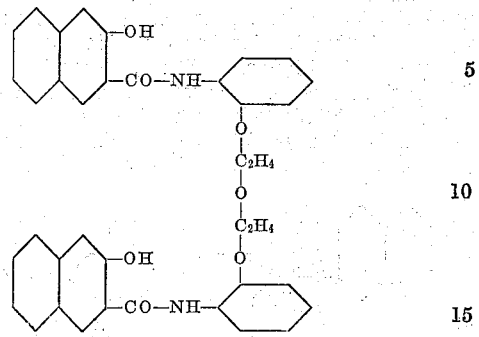

Example II

One hundred forty-four (144) parts beta, beta'-di-(p-amino-phenoxy)-diethyl ether, and 1880 parts of toluene are placed in a vessel equipped with a condenser and mechanical agitation. 188 parts of 2-hydroxy-3-naphthoic acid are added and the whole is heated to 60° C. At this temperature 50 parts of phosphorous trichloride are added and the temperature further raised to the boiling point where it is held for 15 hours. The compound is isolated in the same manner as described in Example I. The product is a very nearly colorless compound, slightly soluble in hot, dilute caustic, but is not readily soluble in most organic solvents. It may be recrystallized from ethyl alcohol.

The formula of this product is probably:

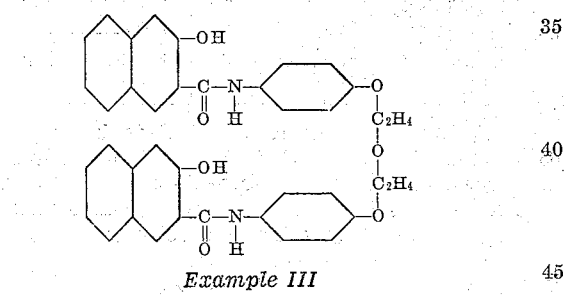

Example III

In a vessel equipped with mechanical agitation and a condenser are placed 213 parts of beta, beta'-di-(p-chloro-o-amino-phenoxy)-diethyl ether. The temperature is raised to 60° C., 50 parts of phosphorous trichloride are added and the temperature further raised until the toluene is boiling. After fifteen hours, 1000 parts of water are added and the mass rendered alkaline with soda ash. The product is isolated in the same manner as described in Example I. The compound thus formed is a nearly colorless solid, slightly soluble in hot, dilute caustic, but is practically insoluble in most organic solvents. It may be recrystallized from alcohol.

The formula for this product is probably:

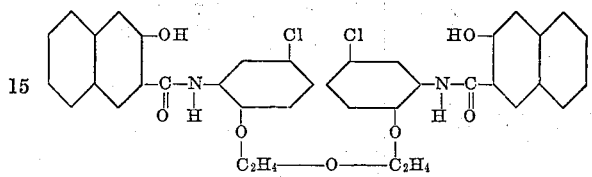

*Example IV*

Three hundred sixteen (316) parts of beta, beta'-di-(para-methyl-ortho-amino-phenoxy)-diethyl ether is mixed with 1500 parts toluene and warmed to 60–80° C. To this 215 parts of 2-hydroxy-3-naphthoyl chloride is gradually added and the temperature raised to boiling and held for 10 or 12 hours. 60 parts of soda ash and 500 parts of water are added and the toluene steam distilled off. The product is filtered and washed well with water. It is a nearly colorless solid, slightly soluble in hot dilute caustic. It may be recrystallized from chlorobenzene.

The formula for this product is probably:

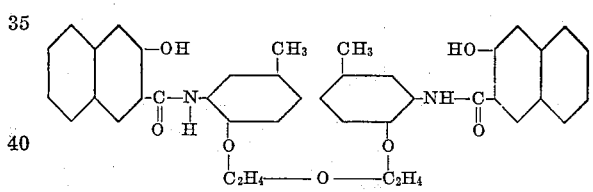

The following table gives examples of various starting compounds, the solvent for their recrystallization and the melting point of each.

| 2-hydroxy-3-naphthoic acid combined with— | Solvent | M. P. °C. |
|---|---|---|
| Beta, beta'-di-(para-amino-phenoxy)-diethyl-ether. | Alcohol | 146–147 |
| Beta, beta'-di-(ortho-amino-phenoxy)-diethyl-ether. | Chlorobenzene | 75– 77 |
| Beta, beta'-di-(para-chloro-ortho-amino-phenoxy)-diethyl-ether. | Alcohol | 118–120 |
| Beta, beta'-di-(para-methyl-ortho-amino-phenoxy)-diethyl-ether. | Chlorobenzene | 168–170 |

These compounds are also called: di-p-amino-diphenoxy-diethyl-ether, di-o-amino-diphenoxy-diethyl-ether, di-p-chloro-di-o-amino-diphenoxy-diethyl-ether, di-p-methyl-di-o-amino-diphenoxy-diethyl-ether, respectively.

The invention is not limited to the use of chlorine substituted products as the compounds may be substituted with other halogens. Similarly, alkyl groups other than the methyl group may be substituted in the benzene residue occurring in the various compounds listed.

Other solvents than toluene may be used in the condensation, it only being necessary that the solvent be somewhat inert.

Other ethers besides diethyl-ether may be used as a base of the compound which is condensed with the naphthoic acid with the limitation that two or more carbon atoms must be in each aliphatic group. Compounds containing less than two carbon atoms are characterized by weak linkage which allows the starting compounds to fall apart in the preparation of the compounds of this invention. Mixed ethers are suitable reagents; for example, ethyl-n-propyl-ether may be used. As an example of a compound in which the phenyl groups of the general formula are differently substituted beta-(ortho-amino-phenoxy)-beta'-(para-chloro-ortho-amino-phenoxy)-di-ethyl-ether may be mentioned.

Instead of starting with 2-hydroxy-3-naphthoic acid, use may be made of 2-hydroxy-3-naphthoyl chloride, in which case conditions suitable for splitting off hydrochloric acid are maintained.

These new compounds are useful intermediates in the preparation of dyestuffs and may be readily coupled with suitable diazo compounds.

As many apparently widely different embodiments of this invention may be made without departing from the spirit and scope thereof, it is to be understood that I do not limit myself to the specific embodiments thereof except as defined in the apended claims.

I claim:

1. The new compounds having the formula:

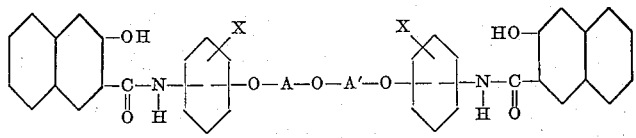

where A is an alkylene group and A' is an alkylene group and X is a member of the group hydrogen, halogen and alkyl.

2. The new compounds having the formula:

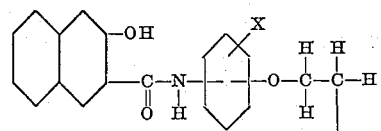

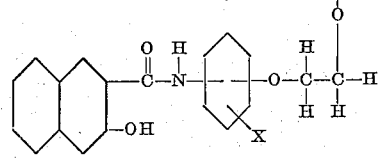

where X is a member of the group hydrogen, halogen and alkyl.

3. The new compounds having the formula:

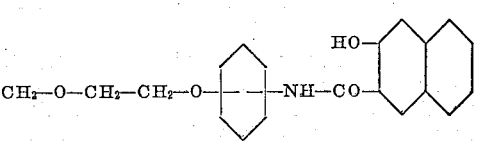

4. The condensation of products of diamino-diphenoxy-diethyl-ethers having the formula:

$$NH_2—C_6H_3X—O—CH_2—CH_2—O—CH_2—CH_2—O—C_6H_3X—NH_2$$

where X is a member of the group hydrogen, halogen, and alkyl, with 2-hydroxy-3-naphthoic acid.

5. The condensation products of diamino-diphenoxy-diethyl-ethers having the formula:

$$NH_2—C_6H_3X—O—CH_2—CH_2—O—CH_2—CH_2—O—C_6H_3X—NH_2$$

where X is a member of the group hydrogen, methyl, and chlorine, with 2-hydroxy-3-naphthoic acid which compounds have the probable formula 6. The condensation products of diamino-diphenoxy-diethyl-ethers having the formula:

$$NH_2—C_6H_4—O—CH_2—CH_2—O—CH_2—CH_2—O—C_6H_4—NH_2$$

with 2-hydroxy-3-naphthoic acid which compounds have the probable formula

7. The condensation product of diamino-diphenoxy-diethyl-ether having the formula:

$$NH_2—C_6H_4—O—CH_2—CH_2—O—CH_2—CH_2—O—C_6H_4—NH_2$$

with 2-hydroxy-3-naphthoic acid, being soluble in chloro-benzene and having a melting point of 75–77° C. and which has the probable formula 8. The condensation product of diamino-diphenoxy-diethyl-ether having the formula:

$$NH_2—C_6H_4—O—CH_2—CH_2—O—CH_2—CH_2—O—C_6H_4—NH_2$$

with 2-hydroxy-3-naphthoic acid, being soluble in alcohol and having a melting point of 146–147° C. and which has the probable formula 9. The condensation product of diamino-diphenoxy-diethyl-ether having the formula:

$$NH_2—C_6H_3Cl—O—CH_2—CH_2—O—CH_2—CH_2—O—C_6H_3Cl—NH_2$$

with 2-hydroxy-3-naphthoic acid, being soluble in alcohol and melting at 118–120° C. and which has the probable formula 10. The condensation product of diamino-diphenoxy-diethyl-ether having the formula:

$$NH_2—C_6H_3CH_3—O—CH_2—CH_2—O—CH_2—CH_2—O—C_6H_3CH_3—NH_2$$

with 2-hydroxy-3-naphthoic acid, being soluble in chlorobenzene and melting at 168–170° C. and which has the probable formula 11. The process comprising condensing with 2-hydroxy-3-naphthoic acid chloride, compounds of the formula:

NH$_2$—C$_6$H$_3$X—O—CH$_2$—CH$_2$—O—
  CH$_2$—CH$_2$—O—C$_6$H$_3$X—NH$_2$ in which X stands for a member of the group H, halogen and alkyl.

12. The process comprising condensing with 2-hydroxy-3-naphthoic acid, compounds of the formula:

NH$_2$—C$_6$H$_3$X—O—CH$_2$—CH$_2$—O—
  CH$_2$—CH$_2$—O—C$_6$H$_3$X—NH$_2$ in which X stands for a member of the group H, halogen and alkyl.

13. The process comprising condensing with 2-hydroxy-3-naphthoic acid chloride, compounds of the formula:

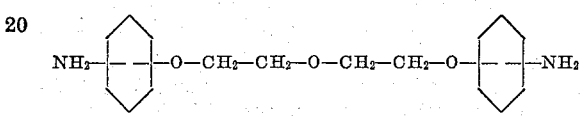

14. The process comprising condensing with 2-hydroxy-3-naphthoic acid, compounds of the formula:

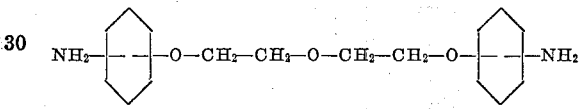

15. The product resulting from the process of slowly heating beta, beta'-di-(o-amino-phenoxy)-diethyl-ether, 2-hydroxy-3-naphthoic acid and toluene to approximately 60° C. with agitation and then adding phosphorous trichloride, thereafter heating to the boiling point, making the mixture alkaline with soda ash and distilling off the toluene, cooling to room temperature and which has the probable formula

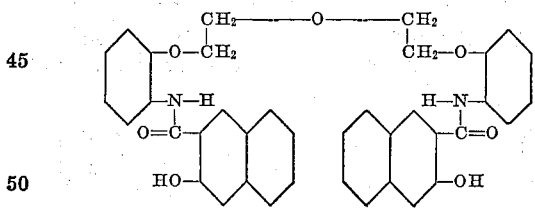

16. The process of slowly heating about one hundred forty-four (144) parts of beta, beta'-di-(o-amino-phenoxy)-diethyl-ether, about one hundred eighty-eight (188) parts of 2-hydroxy-3-naphthoic acid and about one thousand eight hundred eighty (1880) parts of toluene to approximately 60° C. with agitation and then adding about fifty (50) parts of phosphorous trichloride, thereafter heating to the boiling point and maintaining such temperature for about fifteen (15) hours, afterwards adding about one thousand (1000) parts of water, and making the mixture alkaline with soda ash and distilling off the toluene, cooling to room temperature.

17. The compound having the formula

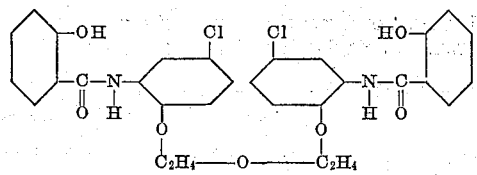

which is a nearly colorless solid, which is slightly soluble in hot dilute caustic, which is practically insoluble in most organic solvents, which may be recrystallized from alcohol, which has a melting point of 118°–120° C. and which may be readily coupled with suitable diazo compounds to form azo dyes.

18. The compound having the formula

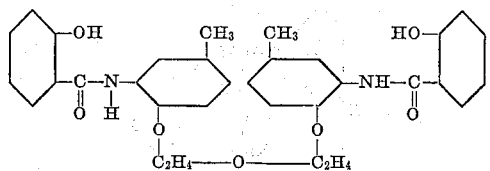

which is a nearly colorless solid, which is slightly soluble in hot dilute caustic, which may be recrystallized from chloro-benzene, which has a melting point of 168°–170° C. and which may be readily coupled with suitable diazo compounds to form azo dyes.

19. The product which has the formula

NH$_2$—C$_6$H$_3$Cl—O—CH$_2$—CH$_2$—O—
  CH$_2$—CH$_2$—O—C$_6$H$_3$Cl—NH$_2$ which is a nearly colorless solid and which is slightly soluble in hot dilute caustic.

MILES A. DAHLEN.